United States Patent
Brown et al.

(12) 
(10) Patent No.: US 6,702,149 B2
(45) Date of Patent: Mar. 9, 2004

(54) TREAT DISPENSER

(76) Inventors: Charles Jason Brown, 8561 NW. Old 169 Hwy., Gower, MO (US) 64454; Susan Leigh Giddens, 18090 SE. 145th Rd., Gower, MO (US) 64454

( * ) Notice: Subject to any disclaimer, the term of this patent is extended or adjusted under 35 U.S.C. 154(b) by 121 days.

(21) Appl. No.: 09/960,146

(22) Filed: Sep. 24, 2001

(65) Prior Publication Data

US 2003/0057228 A1 Mar. 27, 2003

(51) Int. Cl.$^7$ ............................................. A01K 15/02
(52) U.S. Cl. ....................................... 221/264; 221/185
(58) Field of Search ................................ 221/185, 264, 221/263; 222/449

(56) References Cited

U.S. PATENT DOCUMENTS

| | | | | |
|---|---|---|---|---|
| 1,602,358 A | * | 10/1926 | Getskay | 221/264 |
| 2,041,887 A | * | 5/1936 | Ward | 222/449 |
| 2,443,861 A | * | 6/1948 | Johnston | 221/279 |
| 2,518,986 A | * | 8/1950 | Griffith | 222/181.1 |
| 2,561,696 A | * | 7/1951 | Hammer | 222/449 |
| 4,133,452 A | * | 1/1979 | Wiltrout | 221/185 |
| 4,354,619 A | * | 10/1982 | Wippermann et al. | 221/263 |
| 4,381,845 A | * | 5/1983 | Feis | 221/185 |
| 4,405,060 A | * | 9/1983 | Hsei | 221/135 |
| 4,502,612 A | * | 3/1985 | Morrison | 221/185 |
| 5,499,403 A | | 3/1996 | Harrigan | |
| 6,321,933 B1 | * | 11/2001 | Vandenberg | 221/24 |

FOREIGN PATENT DOCUMENTS

| | | | | |
|---|---|---|---|---|
| DE | 137635 | * | 2/1902 | 221/263 |
| FR | 2492343 | * | 4/1982 | 221/263 |

OTHER PUBLICATIONS

Items Labled as F, G and H *Care–A–Lot Pet Supply Warehouse/* Summer 2001 / p. 81.

* cited by examiner

*Primary Examiner*—Donald P. Walsh
*Assistant Examiner*—Daniel K Schlak

(57) ABSTRACT

A conveniently sized and reusable animal treat dispenser (treat(s) will herein after be referred to as positive reinforcement(s)) for use in providing positive reinforcements, in an immediate and non-distracting manner, to reward and reinforce specific behaviors. Generally, the treat dispenser consists of a loading port, housing area, transfer mechanism, dispensing port and spring loaded clip. The treat dispenser is designed for temporary attachment to the trainer's garment; for receiving and housing multiple positive reinforcements; for dispensing a single positive reinforcement upon demand and for automatically reloading a single positive reinforcement for use in continued training. The housing area is lined with a felt or cloth material to reduce noise caused by the treats striking one another or the housing area walls.

6 Claims, 5 Drawing Sheets

TREAT DISPENSER

CROSS-REFERENCE TO RELATED APPLICATIONS—N/A

STATEMENT REGARDING FEDERALLY SPONSERED RESEARCH OR DEVELOPMENT—N/A

REFERENCE TO MICROFICHE APPENDIX—N/A

BACKGROUND OF THE INVENTION

The present invention (herein after referred to as "treat dispenser") relates generally to the art of training animals for the performance of specific acts by utilizing treat(s) (treat(s) will herein after be referred to as positive reinforcement(s)) to reward and reinforce specific behaviors; and particularly for use in training animals utilizing a pre-regulated amount of positive reinforcement of a specific size and shape in an immediate and non-distracting manner.

When training animals it is beneficial for trainers to reinforce specific acts performed by offering positive reinforcement. It is necessary to provide positive reinforcement in an immediate and non-distracting manner to maximize training because an animal's ability to associate positive reinforcement with specific acts is limited to a very short period of time (approximately three (3) seconds) and quickly deteriorates with the passage of time and/or is adversely affected by distracting movements or sounds produced by the trainer obtaining and delivering the positive reinforcement.

Several known methods of providing positive reinforcement are currently employed by trainers. For example, the positive reinforcement can be carried in one's hand, one's mouth (as done in many dog shows), one's pocket, a plastic or paper bag, a bait bag (see Care-A-Lot Pet Supply Warehouse, Summer 2001, Page 81 F & G), a Disposable Pocket for Animal Treats (see U.S. No. 5,499,403) or a Trek-n-Treat (see Care-A-Lot Pet Supply Warehouse, Summer 2001, Page 81 H). Each of these methods, however, produces a distinguishable hindrance that adversely affects the act/reward association time that is so crucial to effective training. Carrying positive reinforcements in one's hand is distracting for the trainer and the animal in that the positive reinforcement soils the trainer's hand, limits the trainer's ability to manually manipulate the animal's leash, body position or fully perform nonverbal gestures which results in fewer hand signals due to the hand's reduced mobility. Additionally, the animal's attention is directed at the hand holding the positive reinforcement. Carrying positive reinforcements in one's mouth is also distracting for the trainer and the animal in that the trainer's mouth is soiled, verbal cues are hindered as the positive reinforcement interferes with the trainer's ability to speak commands and because the positive reinforcement is distracting as it is in fill view of the animal. Carrying positive reinforcements in one's pocket, a bag or a bait bag also hinder's the training process in that rewarding an animal with positive reinforcement may require the trainer to dig into his pocket, unzip or open the containment devise causing harmful delay in the act/reward association time and/or causing the animal to associate his reward with a noise such as a zipper opening, or Velcro being pulled away or the rustling of a plastic or paper bag. Additionally, training an animal utilizing the disposable pocket requires the trainer to consciously count the quantity of positive reinforcements retrieved from the pocket and return any unwanted positive reinforcements before rewarding the animal; therby increasing the act/reward association time. The disposable pocket may also be prone to falling off during prolonged training as the adhesive may lose its grip, or be prone to being knocked off by an exuberant animal, or inclement training conditions such as brush, high grass or during field exercises. Likewise, devises such as bait bag with clip (see Care-A-Lot Pet Supply Warehouse, Summer 2001, Page 81 F) may also be prone to falling off the trainer when the trainer bends down and also in many of the same instances where the disposable pocket is likely to fall off. The disposable pocket may also be cost prohibitive to active trainers as the devise is designed for only one use. Finally, the Trek-n-Treat is not designed to dispense a single treat at a time. As the trainer squeezes the devise, the number of positive reinforcements dispensed varies with each use. As a consequence of the varing number of positive reinforcements dispensed, the trainer's ability to reward the animal in an immediate and non-distracting manner is hindered as the trainer must first determine how he/she will store or dispose of the excess positive reinforcements before rewarding the animal. Common storage or disposal alternatives include: (1) returning the excess positive reinforcements to the dispenser, (2) over-rewarding the animal or (3) storing the excess in hand or otherwise on the trainer's person.

Training animals requires skill, knowledge and a certain degree of patience. Maximizing training efforts also requires the right incentive and the right method of delivery. The above-mentioned methods of providing positive reinforcements are all utilized in an attempt to maximize training efforts. These methods, however, for the reasons previously stated, all produce distinguishable hindrances to maximized training. Therefore, the object of this invention is to provide a means of training animals utilizing positive reinforcements and to solve the problems (i.e. hindrances) of the prior art.

BRIEF SUMMARY OF THE INVENTION

The object of the treat dispenser is to provide a means of training animals utilizing positive reinforcement and to solve the problems (i.e. hindrances) of the prior art.

This object is accomplished by providing a conveniently sized, reusable dispenser capable of being securely attached to the trainer's garment; and capable of receiving and housing multiple positive reinforcements and capable of dispensing a single positive reinforcement upon demand. The advantages of such a devise are numerous and solve many of the problems associated with the prior art. For example, the treat dispenser is designed to be attached to a trainer's outer garment, thereby freeing up the trainer's hands so that the trainer's hands are not soiled by constant contact with the positive reinforcement and the trainer's ability to manually manipulate the animal's position or fully perform nonverbal gestures are not reduced. Additionally, the animal's attention is not diverted by the hand holding the positive reinforcement; thereby reducing visual and olfactory distractions. In addition to solving the problems associated with carrying the positive reinforcement in one's hand, the treat dispenser also solves the problems associated with carrying the positive reinforcement in one's mouth as the trainer's mouth is not soiled, verbal cues are not hindered and the positive reinforcement is not in full view of the animal. The treat dispenser also eliminates the problems associated with using one's pocket, a bag or a bait bag as the trainer is not resigned to digging into a pocket, unzipping a pouch, or opening a containment devise before rewarding the animal. The treat dispenser also prevents the animal from associating his reward with a noise such as a zipper opening, Velcro being pulled away or the rustling of a bag. Additionally, the spring loaded clip on the treat dispenser is better suited for prolonged or active training or training with exuberant animals as the clip is designed to maintain a constant and secure grasp on the trainer's garment; and can be used without the need for a pocket or belt to loop the clip through as the spring loaded clip on the treat dispenser can be attached by simply inserting a fold of the trainer's garment. The treat dispenser is also cost efficient as the invention is designed for infinite use; rather than a single use. Finally, the treat dispenser delivers a single positive reinforcement upon demand of the trainer. The delivery of a single positive reinforcement is extremely important in maximizing the act/reward association time so crucial to effective training. The delivery of a single positive reinforcement is also beneficial to the psyche of the trainer as his/her actions remain focused on training, rather than counting or dealing with unwanted positive reinforcements. The housing area is lined with a felt or cloth-like material to reduce noise caused by the treats striking one another or the housing walls.

BRIEF DESCRIPTION OF THE SEVERAL VIEWS OF THE DRAWING

The following views are in reference to the attached drawings.

FIG. 1 also illustrates the stopper 6, trigger and 15A and transfer groove, 4.

FIG. 2 also illustrates the spring-loaded clip, 14, and dispensing port, 16.

FIG. 3 illustrates the location of the loading port, 5; the location of where the stopper, 6, is permanantly fastened, 8; and the location of the dispensing port, 16.

FIG. 5 illustrates the transfer port door, 19.

DETAILED DESCRIPTION OF THE MENTION

The treat dispenser is designed to provide a conveniently sized, reusable dispenser capable of being securely attached to the trainer's garment and capable of receiving and housing multiple positive reinforcements and capable of dispensing a single positive reinforcement upon demand of the trainer. The treat dispenser, except for the return spring, 15C, should be constructed of molded plastic, vinyl or other durable material and should have outer dimensions of approximately 2 ½ inches in width, by 2½ inches in height by 1¼ inches deep. The inner workings of the treat dispenser, including the housing area, 7, transfer cylinder, 15B, and the multiple ports can vary to accommodate the size of the positive reinforcement to be used.

Generally, the treat dispenser includes a loading port, a housing area, a fastening devise, a transfer port, a transfer mechanism and a dispensing port.

Figure 3:
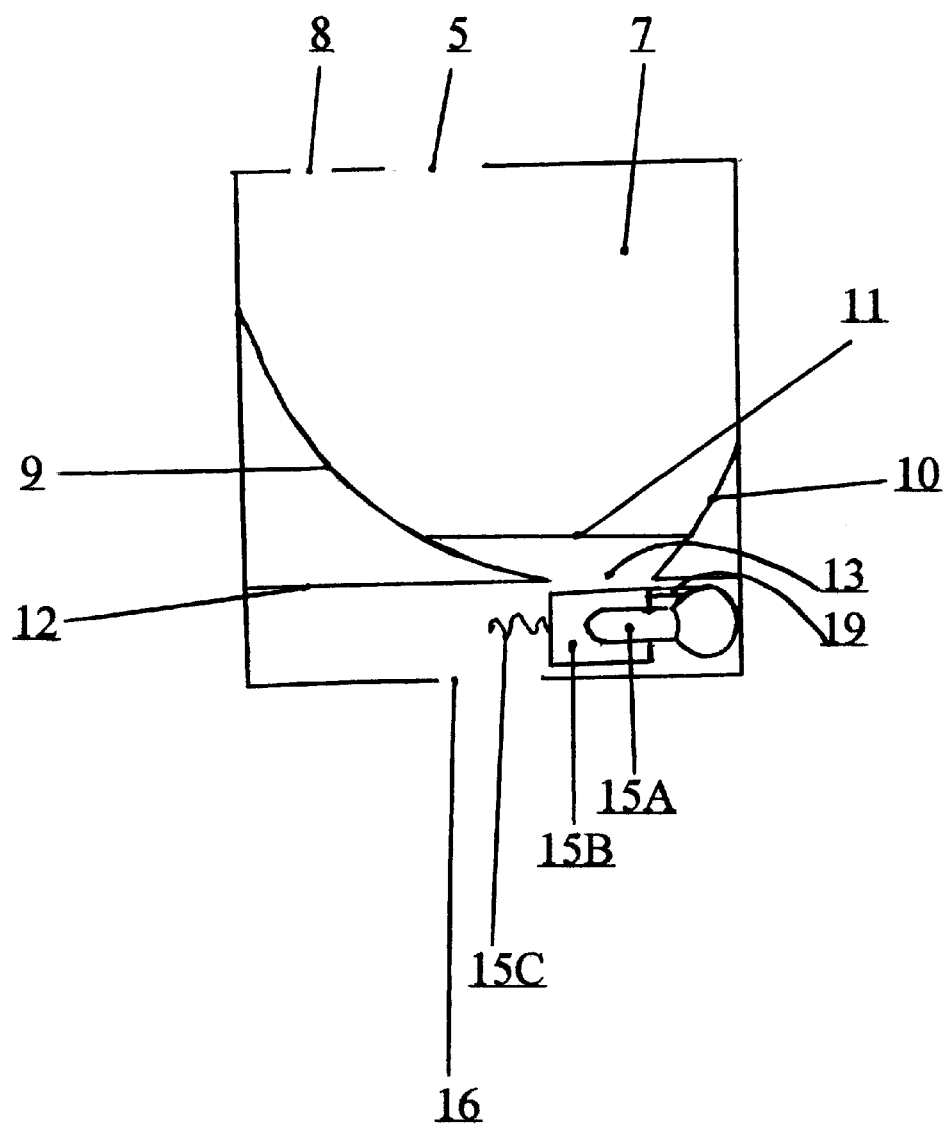
FIG. 3 is an illustration of the internal components and varies ports of the treat dispenser. To illustrate the internal components and varies ports of the treat dispenser, approximately one-quarter (¼) of an inch of the front side, 1, of the treat dispenser has been removed to reveal the internal components and location of the various ports. The internal components include the housing area, 7; the left concave wall, 9, the right concave wall, 10, the back concave wall, 11, and the front concave wall (please note that while the front concave wall is not illustrated, its structure and purpose mirror that of the back concave wall, 11); the transfer port, 13; the transfer mechanism (which is intended to encompass 15A, 15B and 15C); the transfer port door, 19, and the inner ceiling, 12. Additionally.

The first step in utilizing the treat dispenser is to load the housing area, 7, with positive reinforcements. This is done by removing the large end of the stopper, 6, and introducing positive reinforcements into the housing area, 7, via the loading port, 5. The loading port, 5, illustrated in FIG. 3, is a circular hole designed to introduce positive reinforcements into the holding area, 7. The loading port, 5, is opened for loading and closed for containing by means of a stopper, 6. The stopper, 6, is fastened to the treat dispenser at the smaller end, 8, and the larger end is engaged with the loading port, 5, by pushing the stopper, 6, partially through the hole after loading the positive reinforcements.

Figure 4:
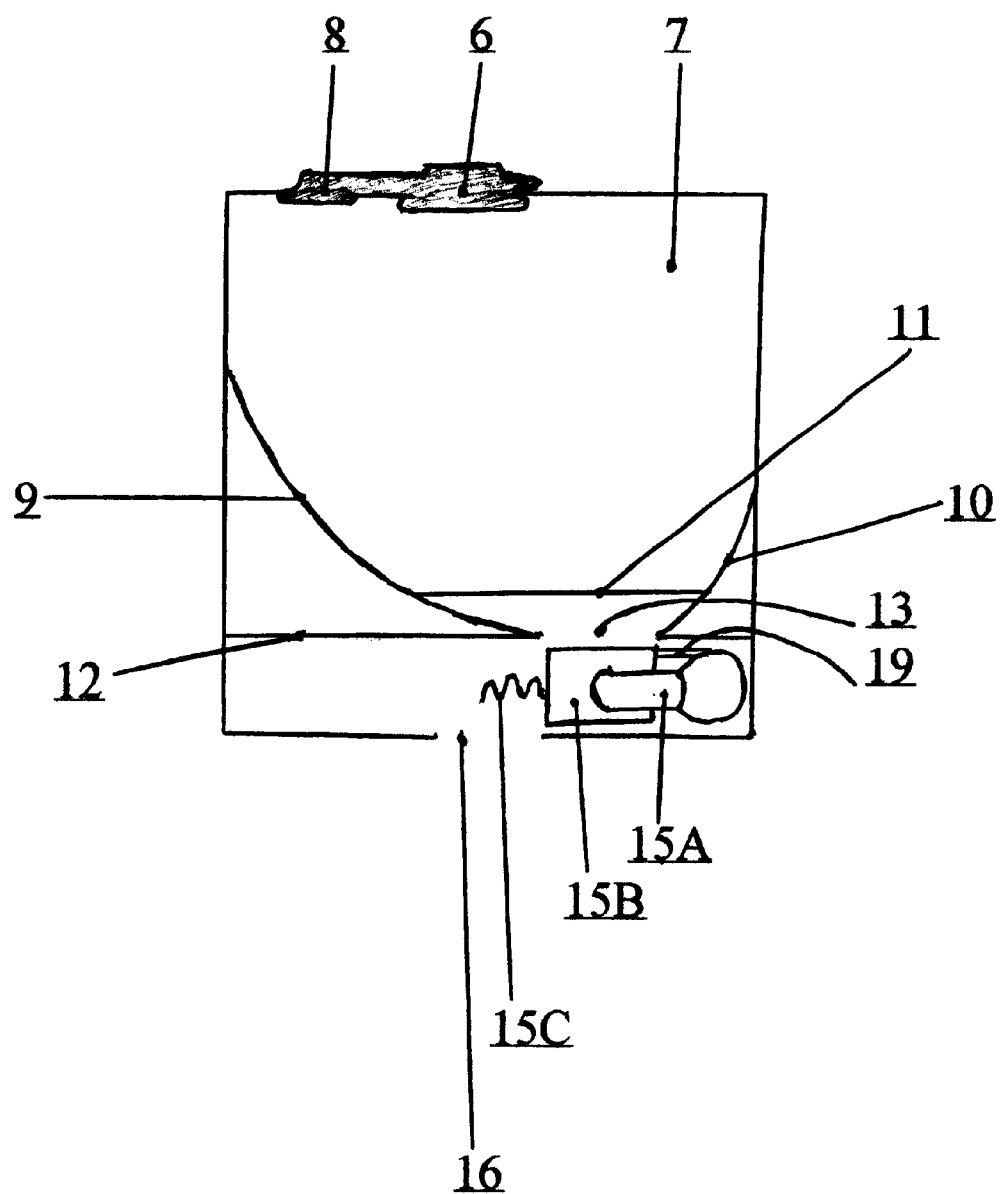
FIG. 4 is a reproduction of FIG. 3 but adds the stopper, 6, for clarification of placement and purpose.

Once the positive reinforcements have been loaded, and the stopper, 6, has closed off the loading port, 5, the positive reinforcements remain stored in the housing area, 7; ready for use. The housing area, 7, illustrated in FIGS. 3 and 4, has the dual purpose of storing multiple positive reinforcements and for serving as a funnel to direct the positive reinforcements into the transfer cylinder, 15B. The housing area, 7, is designed with four inner concave sides, the left concave wall, 9, the right concave wall, 10, and the back concave wall, 11, are illustrated in FIGS. 3 and 4. The front concave wall is not illustrated, as the front side, 1, has been removed to reveal the inner components and varies ports of the treat dispenser. The front concave wall (not illustrated) mirrors the structure and purpose of the back concave wall, 11. Each of these concave walls converge just above the transfer port, 13. The transfer port, 13, is a circular hole designed to allow one positive reinforcement into the transfer cylinder, 15B. The housing area, 7, is lined with a durable felt or cloth material to reduce distracting noise caused by the positive reinforcements striking one another or the housing area walls.

Once the trainer is ready to begin, he/she should fasten the treat dispenser to an outer garment. Fastening the treat dispenser onto an outer garment is accomplished by the fastening devise, 14, illustrated in FIG. 2. The fastening devise is a spring loaded clip designed to accept and tightly grasp the trainer's outer garment.

The next step in utilizing the treat dispenser is to deliver a treat into the hand of the trainer so that he/she may reward the animal for the performance of a desired act. The actual delivery of the treat from within the treat dispenser to the trainer's hand is accomplished via the transfer mechanism, (illustrated in FIGS. 3 and 4 as encompassing 15A, 15B and 15C). To facilitate the delivery of a positive reinforcement, the trainer moves the trigger arm, 15A, backwards. The trigger arm, 15A, illustrated in FIGS. 3, 4 and 5 is specifically designed at a 90 degree angle and is capped with a round head to provide the trainer with an accessible means of controlling the delivery of the positive reinforcement with minimal protrusion and minimal risk of the trigger arm, 15A, being snagged.

In moving the trigger arm, 15A, backwards, the transfer cylinder, 15B, is also moved backwards. The transfer cylinder, 15B, is an opened ended cylinder sized to accept one positive reinforcement at a time and designed to direct said positive reinforcement to the dispensing port, 16. Because the transfer cylinder, 15B, is opened ended, it is necessary to utilize the bottom side, 20, of the treat dispenser as a temporary floor and to utilize the inner ceiling, 12, as a cap until the transfer cylinder, 15B, reaches the dispensing port, 16, where the positive reinforcement will be allowed to fall into the hand of the trainer. It is important to note that the positive reinforcements used in the treat dispenser should be round and of a specific size to allow the positive reinforcements still in the holding area, 7, to roll off the positive reinforcement being transferred via the transfer cylinder, 15B, and to allow those same positive reinforcements still in the holding area, 7, to roll over the edges of the transfer cylinder, 15B, and over the transfer port door, 19, without catching or causing a jam as positive reinforcements with squared or jagged edges may tend to do. The transfer port door, 19, is designed to prevent positive reinforcements from falling behind the transfer cylinder, 15B, during the delivery of a positive reinforcement to the trainer.

Figure 5:
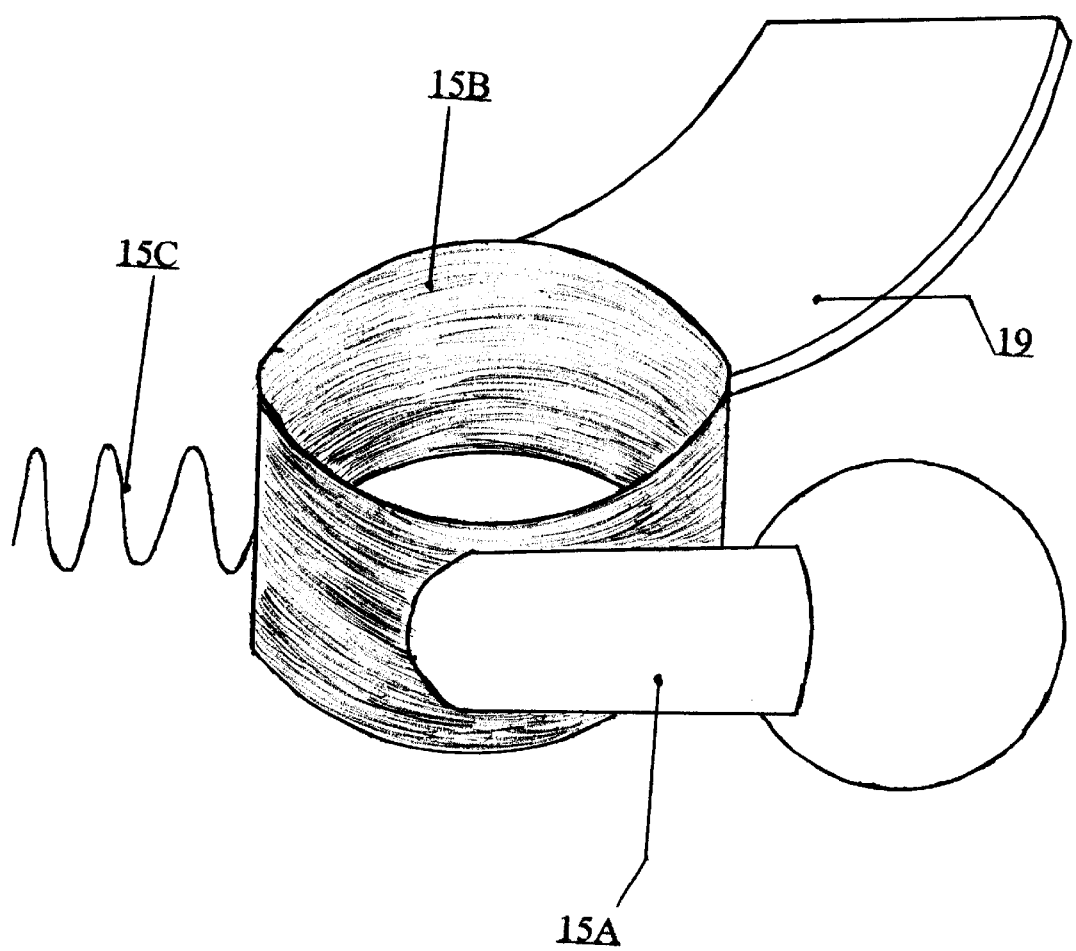
FIG. 5 is an exploded view of the transfer mechanism (which includes the trigger arm, 15A, the transfer cylinder 15B, and the return spring, 15C). Additionally.

Once the trainer has received the positive reinforcement, he/she simple releases the trigger arm, 15A, and the return spring, 15C, which is the final component of the transfer mechanism, illustrated in FIGS. 3, 4 and 5, returns the transfer cylinder, 15B, to its original position under the transfer port, 19. The return spring, 15C, is permanently fastened to the back side, 21, of the treat dispenser and to the transfer cylinder, 15B. The return spring, 15C, is designed to insure that the transfer cylinder, 15B, is always, except when in use by the trainer, just below the transfer port, 19, to receive positive reinforcement. Acting on this design, the transfer cylinder, 15B, is automatically reloaded for repetitive use without interfering with training.

Figure 1:
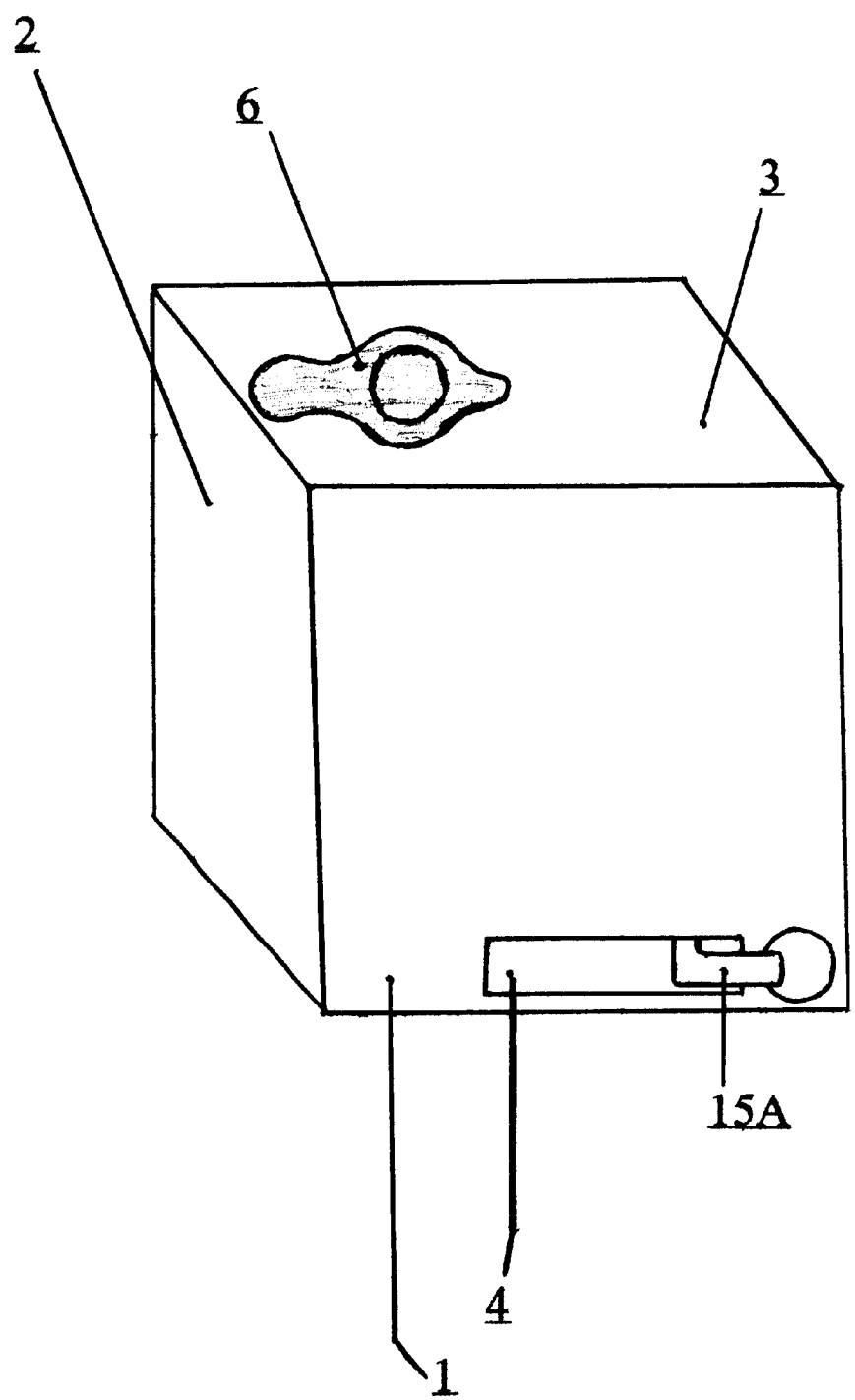
FIG. 1 illustrates the front side, 1, left side, 2, and top side, 3, of the treat dispenser.
Figure 2:
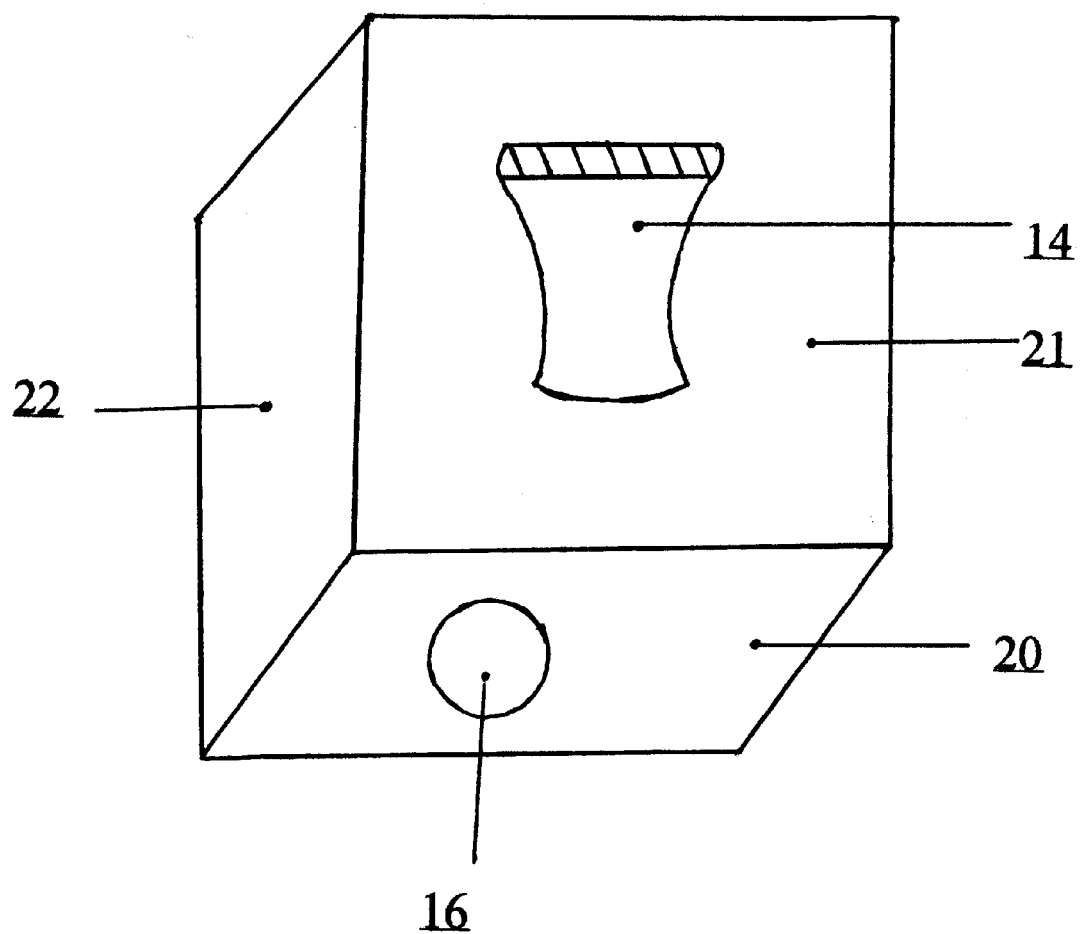
FIG. 2 illustrates the back side, 21, right side, 22, and bottom side, 20, of the treat dispenser.

Finally, the dispensing port, 16, illustrated in FIGS. 2, 3 and 4, consists of a circular hole of a specific size designed to allow the passage of the positive reinforcement from the transfer cylinder, 15B, into to the hand of the trainer.

What is claimed is:

1. A dispenser for housing multiple items and for dispensing items one at a time comprising: a housing with a port and walls directing items to the port, a spring-loaded transfer cylinder for accepting a single item and aligning it with an outlet, an externally accessible trigger for sliding the transfer cylinder and a spring-loaded clip for attachment of the housing to a person, piece of clothing or other material, wherein the housing area is lined with felt or cloth-like material to reduce noise.

2. The dispenser of claim 1 further comprising a loading gate that is permanently affixed to the dispenser.

3. A dispenser for housing multiple items and for dispensing items one at a time comprising: a housing with a port and walls directing items to the port, a spring-loaded transfer cylinder for accepting a single item and aligning it with an outlet, an externally accessible trigger for sliding the transfer cylinder and a housing area lined with a deformable material to prevent noise.

4. The dispenser of claim 3 further comprising a spring-loaded clip for attachment of the housing to a person, piece of clothing or other material.

5. The dispenser of claim 4 further comprising a loading gate that is permanently affixed to the dispenser.

6. The dispenser of claim 3 further comprising a loading gate that is permanently affixed to the dispenser.

* * * * *